(12) United States Patent
Knobel

(10) Patent No.: US 6,217,700 B1
(45) Date of Patent: Apr. 17, 2001

(54) METHOD OF AND APPARATUS FOR MANUFACTURING THERMOSET WEBS OF THERMOPLASTIC POLYMER MATERIAL PARTICLES

(75) Inventor: Ralf Knobel, Göppingen (DE)

(73) Assignee: Schilling-Knobel GmbH, Göppingen (DE)

( * ) Notice: Subject to any disclaimer, the term of this patent is extended or adjusted under 35 U.S.C. 154(b) by 0 days.

(21) Appl. No.: 09/198,008

(22) Filed: Nov. 23, 1998

(30) Foreign Application Priority Data

Nov. 21, 1997 (DE) ............................................. 197 51 516

(51) Int. Cl.[7] .................................................. B29C 67/00
(52) U.S. Cl. ........................ 156/296; 264/125; 264/126; 156/583.1; 156/583.3; 156/583.5
(58) Field of Search ................................ 156/583.5, 296, 156/583.1, 583.3; 264/126, 125

(56) References Cited

U.S. PATENT DOCUMENTS

| 3,313,010 | * | 4/1967 | Betz ...................................... 264/126 |
| 3,367,261 | * | 2/1968 | Kashiwagi .......................... 156/583.5 |
| 4,193,342 | * | 3/1980 | Held .................................. 156/583.5 |

FOREIGN PATENT DOCUMENTS

| 1479090 | 4/1969 | (DE) . |
| 1928405 | 10/1975 | (DE) . |
| 0046526 | 3/1980 | (EP) . |

* cited by examiner

Primary Examiner—Jeff H. Aftergut
(74) Attorney, Agent, or Firm—Friedrich Kueffner

(57) ABSTRACT

A method and an apparatus for manufacturing thermoset webs of thermoplastic polymer material which is comminuted into particles, such as flakes, granulated material or the like or is ground into powder. The thermoplastic polymer material particles are distributed uniformly on the lower conveyor belt; the distance between the lower and upper conveyor belt is maintained equal to the thickness of the web to be manufactured; the initial layer poured onto the surface area of the lower conveyor belt is applied with such a thickness of the layer that the thermoplastic polymer material particles are subjected during the entire transport between the upper and lower conveyor belts in the heating and cooling sections only to a minimum pressure of at most 0.2 bar, wherein the lower and upper conveyor belts are guided in these sections in such a way that temporary deviations from the predetermined thickness of the initial layer do not cause the set minimum pressure to be exceeded, wherein an essentially pressureless bonding of the thermoplastic polymer material particles between each other and with the carrier material takes place in the heating section, and wherein the surfaces of the web are simultaneously smoothed.

12 Claims, 2 Drawing Sheets

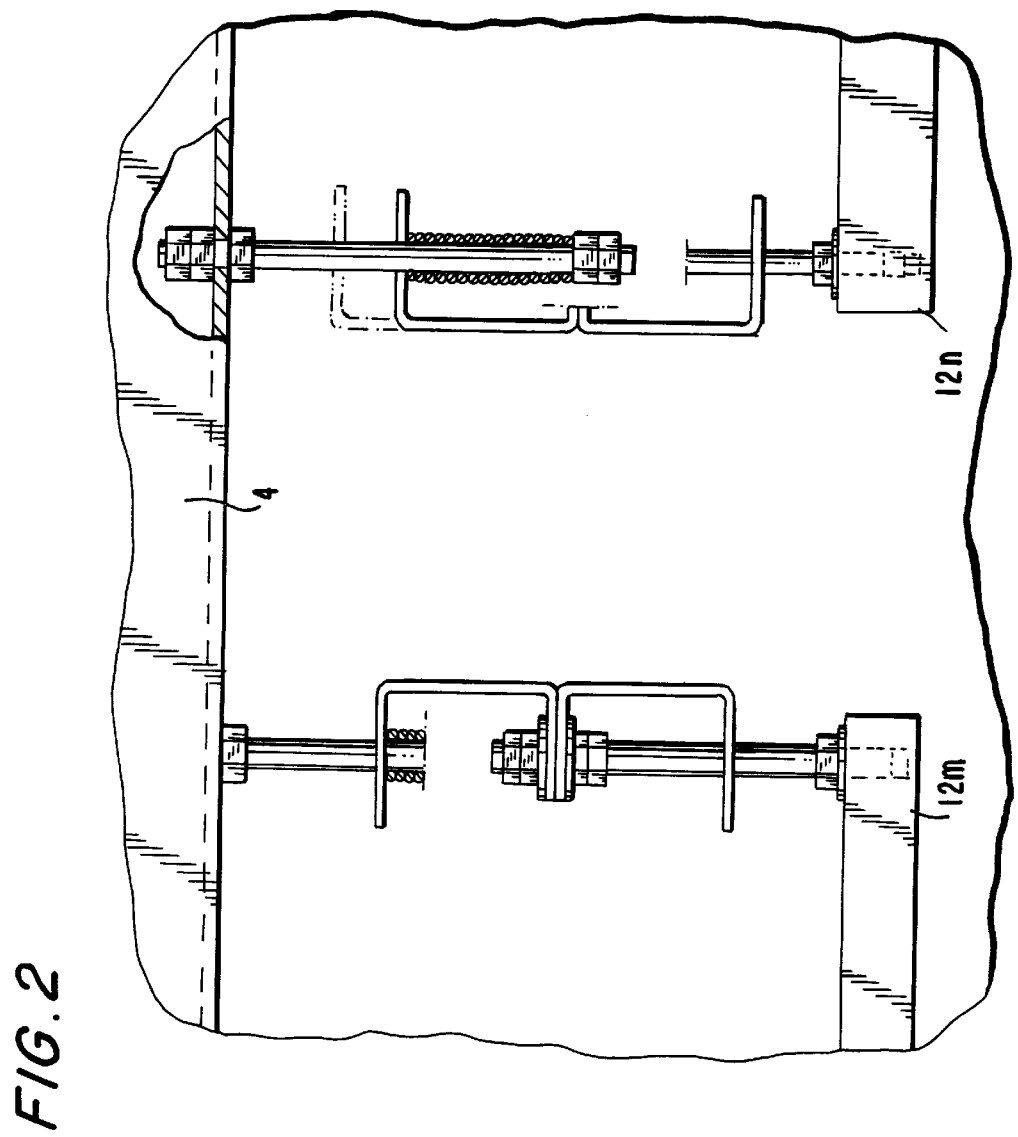

METHOD OF AND APPARATUS FOR MANUFACTURING THERMOSET WEBS OF THERMOPLASTIC POLYMER MATERIAL PARTICLES

BACKGROUND OF THE INVENTION

1. Field of the Invention

The present invention relates to a method and an apparatus for manufacturing thermoset webs of thermoplastic polymer material which is comminuted into particles, such as flakes, granulated material or the like or is ground into powder.

2. Description of the Related Art

For manufacturing webs of thermoplastic polymer materials comminuted into particles, flakes, granulated material or the like, it is known in the art to pour the particles or a mixture of different particles continuously as a surface-covering initial layer onto a conveyer belt and to press and bond this initial layer with a successively or simultaneously carried out application of heat and pressure into a web, wherein the web is subsequently immediately cooled.

In addition, for manufacturing webs of plastic material with patterns, it is known in the art to roll a mixture of flakes of several plastic mixtures having different colors into a web or to roll the mixture of flakes into a single-color web of a thermoplastic mixture, and subsequently to combine one or more of these prepatterned webs and a web having the basic color of the prepatterned web or webs of a compatible thermoplastic mixture with each other by the application of pressure and heat, and to calender the combined webs in the hot state while reducing the thickness thereof.

A manufacturing method of this type is described, for example, in DE-AS 19 28 405. However, this method has the significant disadvantage that only webs having a relatively small thickness of a few millimeters can be produced since the rolling of webs having greater thicknesses above 5 mm causes substantial difficulties because of the danger of bubbles or air inclusions. In addition, the step of calendering resulting in the reduction in the material thickness inevitably also produces an aligned structure of the pattern of the webs in the calendering direction. In the case stronger calendering takes place there is the additional danger that the structure of the pattern is more or less blurred by the formation of mixed colors. This effect of mixed colors and premixing becomes even more pronounced when using particles with different melting viscosities.

Therefore, for manufacturing the webs with non-aligned patterns, techniques have been developed which avoid rolling or calendering as the last step of the manufacture of the web or plates; these techniques are described, for example, in DE-OS 14 79 090 and DE-AS 18 79 822.

In the method mentioned last, the thermoplastic material flakes are uniformly layered into a continuous stack and are heated in the stack, wherein the stack is then cut into a crude block and is compressed in a box die. The desired plates are then cut from the pressed block. This method makes it possible to obtain patterned plates of compact thermoplastic material with non-oriented patterns even with the formation of only small portions of mixed colors. However, this method has the disadvantages that it operates discontinuously which is expensive, and that various dies and long cooling times of the pressed blocks are required so that an economic manufacture is not possible.

A method of continuously manufacturing webs with non-aligned patterns using thermoplastic material particles is disclosed in EP 0 046 526. This method also makes it possible to manufacture webs having greater compact thicknesses of 1.5 to 10 mm, preferably 4 to 8 mm, while avoiding air inclusion and without requiring rolling and calendering procedures. This method specifically provides that the raw material layer composed of the thermoplastic material particles travels through a heating zone and is preheated in the heating zone and the layer is then continuously pressed as it travels through a treatment area, preferably with the use of a double-swing band press, in such a way that the layer is compacted and bonded in a first phase with the application of a pressure of preferably 10–60 bars and heating to a temperature in the range of 160–200° C., and, in a second and immediately subsequent phase, the layer is cooled while maintaining the pressure and is simultaneously pressed to the predetermined thickness. The continuously carried out surface pressure according to this method for compacting and bonding the thermoplastic material particles into a web avoids the disadvantages of the linear pressure application in the case of rolling or calendering of webs and also the conventional discontinuous pressing over sections which was used in the past. However, this method has the disadvantage that, on the one hand, the apparatus for carrying out the method is complicated and, on the other hand, that the method produces a compacted web with surfaces compacted excessively so as to reduce the elasticity thereof, wherein this is caused by the surface pressure applied with high pressure over the entire treatment area.

SUMMARY OF THE INVENTION

Therefore, it is the primary object of the present invention to provide a method of continuously manufacturing webs of thermoplastic polymer material particles in which the webs can be manufactured with patterns which are oriented and non-oriented; in addition, the surfaces of the produced webs should be constructed so as to be very elastic, and the apparatus for carrying out the method should be relatively uncomplicated.

In order to meet the above-stated object, the present invention starts from a method for manufacturing webs of thermoplastic polymer material particles in which the particles, which have a softening point of below 250° C., and which are present in the form of flakes, granular material or the like, are continuously poured to form a surface-covering initial layer directly onto a heat-resistant conveyor belt or a carrier material which preferably has the form of a crude web and is placed on the conveyor belt, and this initial layer is then successively subjected to a preheating section, a heating section and a cooling section of a treatment area, wherein the polymer material particles are covered from the top by a second conveyor belt at least in the heating section and the cooling section.

In accordance with the present invention the following novel method steps are carried out:

a) using at least one first material distributor arranged above the forward free area of the lower conveyor belt, the thermoplastic polymer material particles mixed with binder or without binder are distributed uniformly with a predetermined height on the preferably preheated lower conveyor belt;

b) the distance between the lower and upper conveyor belt is maintained in the entire heating and cooling section equal to the thickness of the web to be manufactured;

c) the initial layer poured onto the surface area of the lower conveyor belt is applied with such a thickness of the layer that the thermoplastic polymer material particles are subjected during the entire transport between the upper and lower conveyor belts in the heating and cooling sections only to a minimum pressure of at most 0.2 bar, wherein the lower and upper conveyor belts are guided in these sections in such a way that temporary deviations from the predetermined thickness of the initial layer do not cause the set minimum pressure to be exceeded;

d) an essentially pressureless bonding of the thermoplastic polymer material particles between each other and with the carrier material to form a thermoset web takes place in the heating section, wherein the surfaces of the web are simultaneously smoothed; and e) following the heating section but before entering the cooling section the surfaces of the web produced by bonding the thermoplastic polymer material particles are smoothed a second time without changing the predetermined thickness by means of a pair of rolls acting on the conveyor belts.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 2 shows detail II of FIG. 1.

FIG. 2 of the drawing shows as detail II of FIG. 1 a guide means of the upper conveyor belt 6 mounted in a floating manner in any predetermined position of the distance L between the conveyor belts.

DESCRIPTION OF THE PREFERRED EMBODIMENTS

Figure 1:
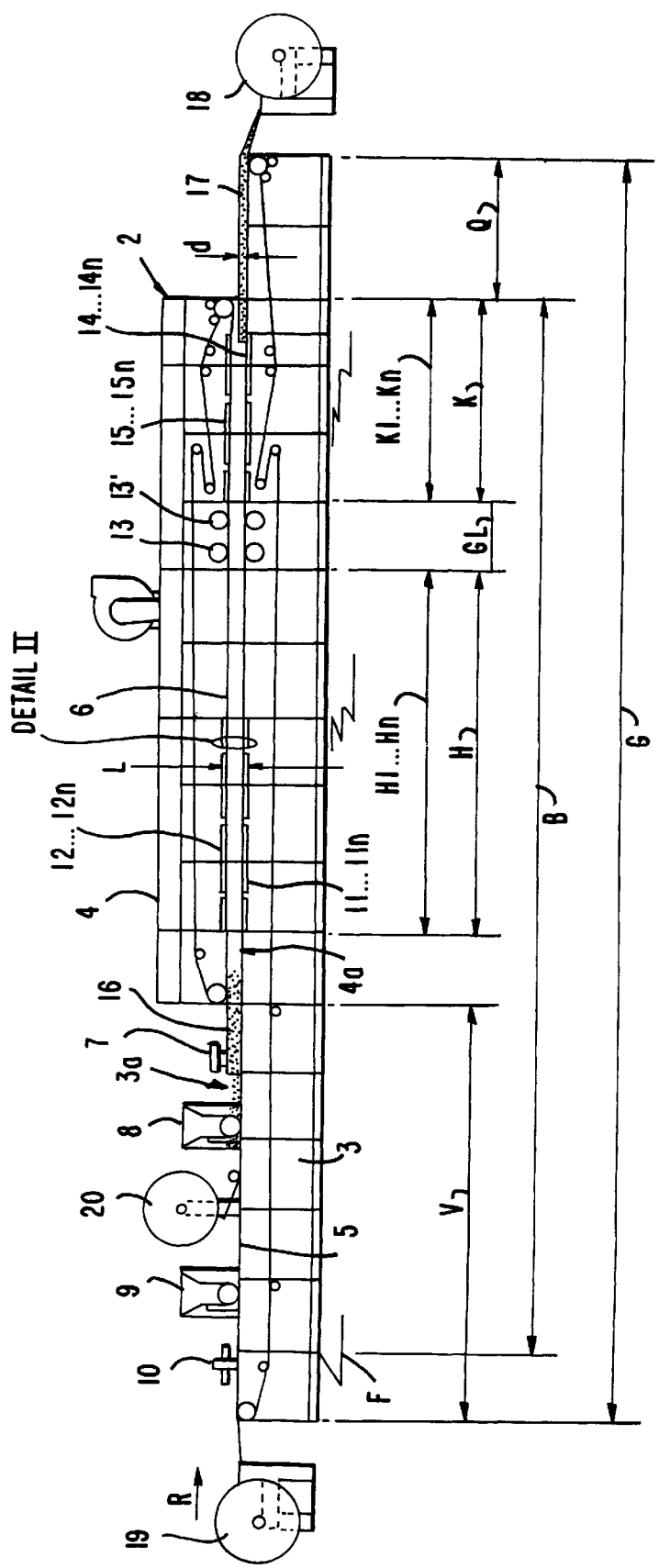
FIG. 1 is a schematic illustration of the apparatus for carrying out the method according to the present invention.

The drawing shows an apparatus 1 for carrying out the method according to the present invention. The apparatus 1 includes a housing 2 divided into a lower housing part 3 and an upper housing part 4 and having a total length G. The housing 2 is placed on a support surface F. The upper housing part 4 extends only from the heating section H to the end of the cooling section K. Preferably seamless conveyor belts 5 and 6 are provided in the upper and lower housing parts 3 and 4, respectively. From the heating section H up to and including the cooling section K, the conveyor belts 5 and 6 are arranged one above the other and at a distance L facing each other. The conveyor belts 5 and 6 are in contact with upper and lower heating elements 11, . . . 11n and 12, . . . 12n, respectively, and cooling elements 14, 14n and 15, . . . 15n, respectively. The movement of the two conveyor belts 5 and 6 takes place synchronously. The apparatus further includes at least one first material distributor 8 provided at the forward section V of the lower conveyor belt 5 and a coiling device 18 for the finished thermoset web 17 provided at the end of the housing 2.

In accordance with the present invention, it is provided that a guide means for the upper conveyor belt 6 can be adjusted and secured in the vertical direction in order to be able to adjust the distance L between the conveyor belts 5 and 6 to the predetermined thickness d of the web 17 to be manufactured. In addition, the guide means of the upper conveyor belt 6 is additionally supported in a floating manner in every predetermined position of the distance L. Accordingly, the upper conveyor belt 6 is mounted so as to be movable by a certain extent relative to the lower conveyor belt 5. Moreover, provided between the heating section H and the cooling section K is an additional smoothing section GL which includes at least one pair of smoothing rolls 13 which act on the conveyor belts 5 and 6.

In accordance with a further development of the present invention, especially the heating section H and optionally also the cooling section K are divided in the conveying direction R into separately controllable heating zones H1, . . . Hn and cooling zones K1, . . . Kn.

Another pair of smoothing rolls 13', which can be switched on optionally, is arranged following the pair of smoothing rolls 13.

In accordance with another further development which is not shown in the drawing, at least one further smoothing section with at least one pair of smoothing rolls acting on the conveyor belts 5 and 6 are arranged within the heating section H between two adjacent heating zones H1/H2 or Hm/Hn.

The contact heat and the conveyor belts 5 and 6 which travel synchronously with uniform speed make it possible for the materials to be uniformly connected or glued or bonded together over the entire width of the finished web, without the formation of creases or material accumulations.

Experiments carried out with the novel method have confirmed that the method can be widely used. For example, before the polymer material particles are poured onto the lower conveyor belt 5, it is possible to impregnate porous mats and other carrier fabrics which are preferably continuously placed on the lower conveyor belt 5 simply with thermoplastic polymers or mixtures of thermostable and thermoplastic materials. Advantages are the smoothing of the fabric and the elimination of porosity of the fabric.

The method according to the present invention also makes it possible to mix and connect together inorganic materials as well as clay, calcium carbonate, glass, minerals and even vulcanized and non-vulcanized rubber materials with the polymer materials. Typically useable fabrics may be composed of polyester, nylon, glass, cotton or a plurality of other textiles or polymer fibers. Moreover, polymer materials can also be connected as second backs to carpets, for example, for the reinforcement thereof. Many of the processes can be carried out in a single pass because the conveyor belts ensure the necessary support from the top as well as from below. For example, it is possible to place a glass fabric onto the forward portion of the lower conveyor belt and to distribute uniformly a certain quantity of a PVC powder as a dry blend on the glass fabric. Subsequently, a second layer composed of thermoplastic chips is poured on top of the powder and is completely melted and impregnates the glass fabric in the apparatus according to the present invention; if required, another layer, for example, a third layer, can be incorporated.

There are no limits to the types of webs that can be manufactured. For example, the method and apparatus according to the present invention can also be used for manufacturing webs whose elasticity is supposed to be low. PVC and polyolefines in particular are capable of adapting over a wide span of variations of the molecular weight and formula compositions to the new method. Consequently, PVC having a crystalline content of between 50 and 90% and with appropriate additional material systems which contain up to 85% inorganic binders can be easily processed, so that the produced web is very hard, stiff and inelastic when leaving the plant.

In the following, several examples of experiments which have been carried out are described; they document the surprisingly varied uses of the novel method and the apparatus for carrying out the method:

EXAMPLE I

Laminating Process

The laminating example is composed of a clear calendered PVC foil having a thickness of, for example, 0.5 mm, which was connected as it travelled through the apparatus 1 with an imprinted calendered carrier material having a thickness of, for example, 1.5 mm. The imprinted carrier material was placed on the forward portion of the lower conveyor belt. Subsequently, the PVC foil is unwound from another crude web supplier 20 onto this carrier material and the two materials then travel together into the treatment area of the apparatus 1. The distance L between the conveyor belts 5 and 6 was adjusted to a gap size of 1.8 mm, wherein this gap was the same in the heating section H and in the cooling section K. The temperatures in the heating section H1 to Hn of the heating section H were adjusted at the top from the front toward the rear to three different values of between 105 and 130° C. and at the bottom from the front toward he rear also to three values which, however, decreased from 160 to 140° C. Both materials were laminated at a travel speed of out 2 m/min through the machine.

EXAMPLE II

Chip-Connecting Process

PVC chips having an average thickness of 1–2 mm, an average width of 0.5–3 mm and an average length of 2–5 mm were poured onto release paper with a density of above 3,000 g/m². The paper with the material poured onto it was then covered with another layer of the paper and moved through the treatment area B of the apparatus 1.

The distance L between the two conveyor belts 5 and 6 was uniformly 2 mm in the heating section H as well as in the cooling section K. The temperature in the heating zones H1 to Hn were at the top from the front toward the rear 195–185–175° C. and the bottom continuously 200° C. The travel speed was adjusted to 2 m/min.

It was possible to obtain at the end of the apparatus 1 a decorative homogenous vinyl floor covering having a thickness of 2 mm.

EXAMPLE III

Penetration and Powder Connecting Process

A glass fabric called "SH 40/2" was placed on release paper and then a pulverous mixture with a density of preferably 400 g/m² was poured on the glass fabric. Another paper was then placed on the top and everything together was moved through the treatment area. The travel speed was adjusted to 2.5 m/min and the gap was adjusted to the thickness of the carrier materials.

The temperatures in the heating zones H1 to Hn were at the top from the front toward the rear 195–185–175° C. and at the bottom continuously 195° C.

At the end of the apparatus 1, a completely impregnated glass fabric was produced with a smooth surface on both sides. The powder was totally bonded and the glass fabric was completely enclosed.

EXAMPLE IV

Multiple-Layer Composite Material in Connection With Pulverous Foam Process

A floor carpet carrier material was placed with the rear side thereof facing upwardly onto release paper and onto the lower conveyor belt 5. A non-foaming powder mixture was poured onto the rear side of the carpet carrier with a density of preferably 820 g/m². From another crude web supplier, a glass fabric (40 g/m²) was placed thereon and everything was moved under a preheater, for example, an infrared heater, adjusted to 60% of its capacity, at a speed of 1 m/min.

The temperature indication at a radiation thermometer indicated 147° C. Directly thereafter a pulverous foam was poured onto the preheated glass fabric support with a density of preferably 1,000 g/m² and was once again moved under a second infrared heater with a capacity of 50%, a temperature of 130° C. and a speed of 1 m/min. With a second release paper placed on top and with an increased travel speed of 2 m/min, the multiple-layer material was then moved into the heating section H and through the further sections of the treatment area B. In this specially modified embodiment, the distance between the conveyor belts 5 and 6 was adjusted in the heating section H to 8.5 mm and in the cooling section to 10 mm. The temperatures in the heating zones H1 to Hn were at the top decreasing from the front toward the rear between 220 and 200° C. and at the bottom continuously at 90° C.

The various layers of this special carpet or covering had a very good connection to each other and a foam layer of 2 mm thickness was produced on the rear side. The expansion of the foam was at a ratio of 2:1.

However, the decisive aspect of this embodiment is the fact that the new method makes it possible to carry out in one pass simultaneously a connecting process and a foaming process.

EXAMPLE V

Multiple-Layer Composite Material in Connection With Recycling Material Process A floor covering carrier material was placed with the rear side thereof facing upwardly onto release paper and onto the lower belt. A non-foaming powder mixture was poured onto this rear side of the carpet carrier with a density of 820 g/m². A glass fabric (40 g/m²) arriving from an unwinding station was placed thereon and moved under an infrared heater adjusted to 50% of its capacity at a speed of 1 m/min. The temperature indication at a radiation thermometer was 146° C. Granular recycled material was then poured onto the glass fabric with a density of 2,500 g/m². After irradiation with a second infrared heater and an indicated temperature of 82° C., the speed was raised to 2 m/min, a second paper was placed thereon and moved into the heating section H. As the product travelled through the heating and cooling zones, the gap distance between the conveyor belts was 8 mm. The temperature at the top was continuously above 200° C. and at the bottom continuously below 130° C. in all heating zones.

A product was produced which had a very good connection between all layers, without damaging the surface of the carpet. In this process, several steps were carried out in one pass with the use of 100% recycled material for the strengthened rear side. The same experiment was also carried out with a powder which was identical to the granular material and under the same conditions. The result achieved was equivalent.

While specific embodiments of the invention have been shown and described in detail to illustrate the inventive principles, it will be understood that the invention may be embodied otherwise without departing from such principles.

I claim:

1. In a method of manufacturing thermoset webs of thermoplastic polymer material particles, in which the thermoplastic polymer material particles are continuously poured in a surface-covering manner to form an initial layer directly onto a heat-resistant lower conveyor belt, and in which the initial layer then successively travels through a preheating section, a heating section and a cooling section of a treatment area, wherein the polymer material particles are covered at least in the heating section and in the cooling section from the top by an upper conveyor belt, the improvement comprising the steps of:

a) uniformly pouring the thermoplastic polymer material particles mixed with binder or without binder by means of at least one first material distributor arranged above a front, non-covered portion of the lower conveyor belt to form the initial layer with a predetermined thickness;

b) maintaining a distance between the lower conveyor belt and the upper conveyor belt in the heating section and in the cooling section equal to the thickness of the web to be manufactured;

c) applying the initial layer with such a thickness onto the lower conveyor belt that the thermoplastic polymer material particles during travel thereof between the lower and upper conveyor belts in the heating and cooling sections are subjected to a minimum pressure of at most 0.2 bar, and guiding the upper and lower conveyor belts in heating and cooling sections such that temporary deviations from the predetermined thickness of the initial layer do not result in the minimum pressure being exceeded;

d) bonding together the thermoplastic polymer material particles essentially without pressure in the heating section to form the thermoset web and simultaneously subjecting the web to surface smoothing; and e) once again smoothing the surfaces of the web by means of at least one pair of smoothing rolls acting on the lower and upper conveyor belts and mounted between the heating section and the cooling section.

2. The method according to claim 1, further comprising pouring the thermoplastic polymer material particles onto a carrier material placed onto the heat-resistant lower conveyor belt.

3. The method according to claim 1, comprising preheating the lower conveyor belt before the thermoplastic polymer material particles are poured thereon.

4. The method according to claim 1, wherein the heating section has a plurality of temperature zones, further comprising separately controlling the temperature zones to equal or different temperatures.

5. The method according to claim 1, wherein the cooling section has a plurality of temperature zones, further comprising separately controlling the temperature zones to equal or different temperatures.

6. The method according to claim 4, comprising dividing the temperature zones into lower and upper temperature zones.

7. The method according to claim 5, comprising dividing the temperature zones into lower and upper temperature zones.

8. In an apparatus for producing thermoset webs of thermoplastic polymer material particles, the apparatus including a housing having a lower housing part and an upper housing part, the lower housing part having a lower conveyor belt and the upper housing part having an upper conveyor belt, the housing having a front section, a heating section and a cooling section following the heating section, wherein the upper housing part only extends over the heating section and cooling section, wherein the conveyor belts are arranged in the heating section and in the cooling section at a distance from each other and facing each other and are in contact with lower and upper heating elements and cooling elements, with means for synchronously moving the conveyor belts, and with at least one first material distributor in the front section for placing material onto the lower conveyor belt and a coiling device for the web at an end of the housing, the improvement comprising guide means for adjusting and securing the upper conveyor belt in a vertical direction for adjusting the distance between the conveyor belts to a predetermined thickness of the web, wherein the guide means are additionally mounted in a floating manner in any predetermined position of the distance between the conveyor belts, and an additional smoothing section between the heating section and the cooling section, the additional smoothing section being comprised of at least one pair of smoothing rolls acting on the conveyor belts.

9. The apparatus according to claim 8, wherein the heating section comprises separately controllable heating zones.

10. The apparatus according to claim 8, wherein the cooling section comprises separately controllable cooling zones.

11. The apparatus according to claim 8, comprising an additional pair of smoothing rollers downstream of the pair of smoothing rollers, and means of optionally switching on the additional pair of smoothing rollers.

12. The apparatus according to claim 9, further comprising at least one additional smoothing section between two adjacent heating zones within the heating section, the additional smoothing section comprising at least one pair of smoothing rolls acting on the conveyor belts.

* * * * *